(12) United States Patent
Nemire (10) Patent No.: US 6,978,571 B1
(45) Date of Patent: Dec. 27, 2005

(54) FISHING LURE SYSTEM

(76) Inventor: John E. Nemire, 8334 E. San Sebastian Dr., Scottsdale, AZ (US) 85258

( * ) Notice: Subject to any disclaimer, the term of this patent is extended or adjusted under 35 U.S.C. 154(b) by 0 days.

(21) Appl. No.: 09/079,814

(22) Filed: May 16, 1998

(51) Int. Cl.$^7$ ............................................. A01K 85/00
(52) U.S. Cl. ....................... 43/42; 43/42.17; 43/42.51
(58) Field of Search ........................... 43/42.16, 42.17, 43/42.19, 42.2, 42.21, 42.31, 42.51, 42.52

(56) References Cited

U.S. PATENT DOCUMENTS

| | | | | |
|---|---|---|---|---|
| 1,870,559 | A | * | 8/1932 | Drake ........................ 43/42.31 |
| 2,238,292 | A | * | 4/1941 | Schavey .................... 43/42.17 |
| 2,319,026 | A | * | 5/1943 | Adam ........................ 43/42.17 |
| 2,778,143 | A | * | 1/1957 | Bratz, Sr. .................. 43/42.31 |
| 3,091,049 | A | * | 5/1963 | Reimers .................... 43/42.31 |
| 3,877,168 | A | * | 4/1975 | Stevens ..................... 43/42.31 |
| 4,203,246 | A | * | 5/1980 | Sacharnoski, Sr. ......... 43/42.31 |
| 4,432,157 | A | * | 2/1984 | Gowing ..................... 43/42.31 |
| 4,646,463 | A | * | 3/1987 | Koch ........................ 43/43.13 |
| 4,803,793 | A | * | 2/1989 | Schellenberg, III ........ 43/42.33 |
| 5,499,471 | A | * | 3/1996 | Foutch et al. .............. 43/42.31 |
| 5,517,782 | A | * | 5/1996 | Link ......................... 43/42.31 |
| 5,524,378 | A | * | 6/1996 | Hood ........................ 43/42.31 |
| 5,551,185 | A | * | 9/1996 | Reed ......................... 43/42.39 |
| 5,586,405 | A | * | 12/1996 | Fike ......................... 43/42.31 |
| 5,890,315 | A | * | 4/1999 | Norton ...................... 43/42.31 |

* cited by examiner

*Primary Examiner*—Kurt Rowan (57) ABSTRACT

Described is a fishing lure system for use with fishing line. The fishing lure system consists of a spoon shaped lure body having a convex inner surface on which is attached a hook. Centrally mounted to the convex inner surface is a bracket having a curved portion to hold a rattle. The bracket also includes an elongated portion on which is mounted a removable skirt. Attached to the top surface of the bracket is a brush guard having a plurality of filaments extending from the bracket to the hook end. A connector is attached to the lure body for connection to a fishing line. The connector may optionally consist of an elongated wire on which is mounted a propeller.

4 Claims, 5 Drawing Sheets

FISHING LURE SYSTEM

BACKGROUND OF THE INVENTION

1. Field of the Invention

This invention relates to providing a fishing lure system of the type used with fishing poles. More particularly, this invention concerns providing a fishing lure system whereby a spoon-type lure is provided with a bracket for holding an assortment of attachments including a rattle and skirt.

2. Description of the Prior Art

Typically, artificial fishing lures are used to simulate a natural food source that a fish will either recognizes or find appealing. It is well known that the more realistic an artificial lure appears to a fish, the greater the probability that the fish may be tricked. To this purpose, man has endeavored to develop artificial lures that will increase that probability. To this end, a variety of artificial lures have been developed such as flies, spoons, spinners, and flatfish which have met with some success depending on the species of fish sought.

Prior art attempts have been made to improve upon the basic idea behind the above mentioned lure types by providing additional features which operate to make the lure more irresistible to fish. For example, U.S. Pat. No. 5,524,379 to Hood, U.S. Pat. No. 5,517,782 to Link et al and U.S. Pat. No. 5,001,856 to Gentry teach artificial lures which incorporate the use of a rattle. All teach the use of a rattle which is either attached, or located proximally adjacent to, the hook thereby making the rattle susceptible to loss or damage due to fish strikes or contact with water debris.

Prior art attempts have also been made to incorporate the rattle into the body of the lure. For example, U.S. Pat. No. 4,791,750 to Gammill teaches a jig style lure in which a rattle is imbedded in the jig body. Though this arrangement may sufficiently protect the rattle from loss or damage, encapsulating the rattle within the body may cause dampening of the rattle's vibration thereby decreasing the rattle's effectiveness.

Prior art attempts have also been made to attach a skirt to spoon style lures. For example, U.S. Pat. No. 4,542,607 to Cartwright and U.S. Pat. No. 4,435,914 to Norman teach spoon style lures in which a skirt is affixed to the hook. A prior art attempt to attach the skirt to the concave inner surface of a spoon body is found in U.S. Pat. No. 5,077,931 to Marshall. Marshall teaches a spoon style lure in which the skirt is attached to the spoon body by use of a threaded fastener. Though Cartwright, Norman and Marshall may produce adequate results, they fail to teach a skirt which may be quickly detached from a spoon style lure without the need for tools.

OBJECTS OF THE INVENTION

A primary object of the invention is to fulfill the above-mentioned needs by the provision of a fishing lure system that efficiently allows for the attachment of a variety of accessories to the lure body. A further primary object of the present invention is to provide such a fishing lure system which is inexpensive, simple to use and simple to manufacture. Other objects of this invention will be apparent with reference to the following invention descriptions.

SUMMARY OF THE INVENTION

According to a preferred embodiment of the present invention, this invention provides a fishing lure, for use with a fishing rod having a fishing line, for catching fish, comprising in combination: an elongated body portion having longitudinal central axis, a concave inner surface, a convex outer surface, a rounded leading edge, and a rounded trailing edge, such body portion further having a hole therethrough; a snaring means, attached to such body portion, for ensnaring a fish; a rattle means, attached to such body portion, for emitting a vibration; a holding means, attached to such concave inner surface of such body portion, for holding such rattle means; an attachment means for attaching such fishing line to such body portion.

Further, this invention provides such a fishing lure wherein such holding means comprises a bracket having an elongated portion, a top surface and a curved portion, such curved portion being structured and arranged to partially encircle such rattle means; and, further, wherein such rattle means comprises a rattle having a cylindrical body portion having a chamber therein for holding at least one moveable body. And, it provides such a system wherein such leading edge has a larger radius than such trailing edge; and, further, wherein such snaring means comprises at least one hook having a hook first end.

Also, this invention provides such a fishing lure further comprising a weed guard attached to such top surface of such bracket, such weed guard comprising: a holder having a hollow upper end; a plurality of filaments having filament ends, such filament ends being structured and arranged for frictional attachment to such hollow upper end of such holder; and, further, it provides such a wherein such filaments substantially span a distance between such concave inner surface and such hook first end. And it provides such a fishing lure further comprising a skirt having a skirt end, such skirt end being removably attached to such elongated portion of such bracket. Additionally, it provides such a fishing lure wherein such bracket further comprises an elongated second portion structured and arranged to substantially span a distance between such curved portion and such rounded leading edge of such spoon portion.

In addition, it provides such a fishing lure wherein such attachment means is attached to such leading edge of such body portion between such concave inner surface and such elongated second portion of such bracket. And further, it provides such a fishing lure wherein such attachment means comprises an elongated wire having: a looped first end for attachment to a fishing line; a substantially straight central portion having a central axis; and a looped second end structured and arranged for attachment to such concave inner surface of such body portion; wherein such elongated wire is structured and arranged to pass through such hole in such body portion.

And, further still, it provides such a fishing lure further comprising a propeller structured and arranged for rotation around such central axis of such center portion of such elongated wire; and, additionally, it provides such a fishing lure wherein such propeller comprises: a substantially flat body having a first body end; integrally attached to such first body end a pair of substantially circular propeller portions, each such circular propeller portion having a substantially circular inner surface and a substantially circular outer surface. Also, it provides such a fishing lure wherein such hole in such body portion is adjacent to such rounded leading edge of such body portion; and, further, wherein such hole in such body portion is structured and arranged for location adjacent such longitudinal central axis of such body portion at approximately twelve percent of the distance from such rounded leading edge to such rounded trailing edge.

Even further, in accordance with a preferred embodiment thereof, the present invention provides a fishing lure, for use with a fishing rod having a fishing line, for catching fish, comprising in combination: an elongated body portion having a concave inner surface, a convex outer surface a rounded leading edge, and a rounded trailing edge, such body portion further having a hole therethrough; at least one hook having a hook first end and a hook second end, such hook second end being structured and arranged for attachment to such body portion; a rattle, attached to such body portion, having a cylindrical body portion having a chamber therein for holding at least one moveable body; a bracket attached to such body portion and having an elongated portion and a curved portion, such curved portion being structured and arranged to partially encircle such rattle; an attachment means for attaching such fishing line to such body portion; a weed guard attached to such concave inner surface of such body portion; and a skirt having a skirt first end, such skirt first end being removably attached to such elongated portion of such bracket; wherein such leading edge has a larger radius than such trailing edge; and wherein such hole in such body portion is structured and arranged for location adjacent such longitudinal central axis of such body portion at approximately twelve percent of the distance from such rounded leading edge to such rounded trailing edge.

Moreover, the present invention provides such a fishing lure wherein such bracket further comprises an elongated second portion structured and arranged to substantially span a distance between such curved portion and such rounded leading edge of such spoon portion. Also, it provides such a fishing lure wherein such attachment means is attached to such leading edge of such body portion between such concave inner surface and such elongated second portion of such bracket. It also provides such a system wherein such attachment means comprises an elongated wire having: a looped first end for attachment to a fishing line; a substantially straight central portion having a central axis; and a looped second end structured and arranged for attachment to such concave inner surface of such body portion; wherein such elongated wire is structured and arranged to protrude through a hole in such body portion. In addition, the present invention provides for a fishing lure further comprising a propeller structured and arranged for rotation around such central axis of such center portion of such elongated wire.

Additionally, according to a preferred embodiment of this invention, the present invention provides for a rattle for use with a fishing lure, comprising: a cylindrical body portion having a pair of open ends; a spherical bearing attached to each such open end of such body portion thereby forming a chamber within such body portion; disposed within such chamber, at least one moveable body. Also, it provides for such a rattle wherein such cylindrical body portion is made essentially of stainless steel; such moveable body within such interior chamber of such rattle is made essentially of stainless steel; and such spherical balls are made essentially of stainless steel.

Even moreover, in accordance with a preferred embodiment thereof, the present invention provides for a propeller for use with a fishing lure, comprising: a body portion having a longitudinal central axis, a rear edge, and having a central hole therethrough; integrally attached to such body portion a front tab having a front tab hole therethrough and a rear tab having a rear tab therethrough, such front tab and such rear tab being bent in substantially parallel planes and at a substantially right angle to the plane of the body portion; a first lobe, integrally attached to such rear edge of such body portion and having a substantially circular inner surface and a substantially circular outer surface, such first lobe being bent at a substantially right angle to the plane of such body portion; and a second lobe, integrally attached to such rear edge of such body portion and having a substantially circular inner surface and a substantially circular outer surface, such second lobe being bent opposite of such first lobe and at a substantially right angle to the plane of such body portion; wherein such front tab hole, such rear tab hole, and such central hole are structured and arranged for pivotal mounting to an elongated wire; and wherein each of said pair of sides is cut away in a concave manner so that each said side meets said front edge in a manner essentially asymptotic to said central axis. It also provides for such a propeller wherein such body portion, such first lobe and such second lobe are made of brass; and a plane of such first lobe and a plane of such second lobe are at an approximate angle of 45 degrees with respect to such longitudinal axis of such body portion.

DETAILED DESCRIPTION OF A PREFERRED EMBODIMENT AND THE BEST MODE OF PRACTICE

Shown in FIGS. 1–4 is a preferred embodiment of the fishing lure 20 of the present invention. The fishing lure 20 comprises a substantially spoon-shaped body 21 (preferably made of brass) having a convex outer surface 22 (as shown best in FIG. 3), a concave inner surface 23, a rounded leading edge 26, and a rounded trailing edge 27. To provide greater lift at the rounded leading edge 26, the body portion 21 is structured and arranged so that the rounded leading edge 26 has a larger radius than the rounded trailing edge 27. A hook 28, readily selectable by one having skill in such art, is also provided. The hook 28 (embodying herein a snaring means, attached to such body portion, for ensnaring a fish) comprises a pointed hook first end 29, a shank portion 30, and looped hook second end 33 (as shown best in FIG. 5) which is attached, preferably by use of a rivet fastener 34, to the concave inner surface 23 of body portion 21. The shank portion 30 of hook 28 is structured and arranged to penetrate the body portion 21 through slot 35 (as shown best in FIG. 5) which is arranged to lie substantially along the central longitudinal axis of body portion 21 adjacent the rounded trailing edge 27.

To facilitate attachment of the body 21 to a fishing line 36, a substantially-rigid elongated wire or rod member 37 is provided. Rod member 37 (embodying herein an attachment means for attaching such fishing line to such body portion) comprises a substantially straight central portion 38 (as shown best in FIG. 5) and a looped first end 40 (as shown best in FIG. 5) which is mechanically attached, preferably by use of a rivet fastener 34, to the concave inner surface 23 of body portion 21. Rod member 37 is further provided with a looped second end 41 structured and arranged so as to allow for attachment of fishing line 36. As shown best in FIG. 2, rod member 37 is structured and arranged to penetrate the body portion 21 through rod hole 42. It is preferred that rod hole 42 be located adjacent the rounded leading edge 26 (and adjacent the longitudinal central axis of the body portion 21) at approximately 12 percent of the distance from the rounded leading edge 26 to the rounded trailing edge 27. It has been found that this location of the rod hole 42 provides for greater lift at the rounded leading edge 26 thereby allowing the fishing lure 20 to ride on the water's surface more efficiently at slow retrieval speeds. In addition, the preferred location of the rod hole 42 creates an increase in lifelike vibratory movement of the fishing lure 20; particularly when retrieved at slow speeds. Pivotally attached to the central portion 38 of rod member 37 is a propeller or spinner 43, preferably made of nickel plated brass, which provides for both added lift at the leading edge 26 of body portion 21 and a more lifelike vibratory movement in the fishing lure 20. The details of the spinner 43 will be discussed more fully hereinafter with respect to FIG. 8. To prevent the spinner 43 from contacting the body portion 21 or looped second end 41 during use, a plurality of spacers 44, of the type readily selectable by those skilled in the art, are attached to rod member 37.

Figure 1:
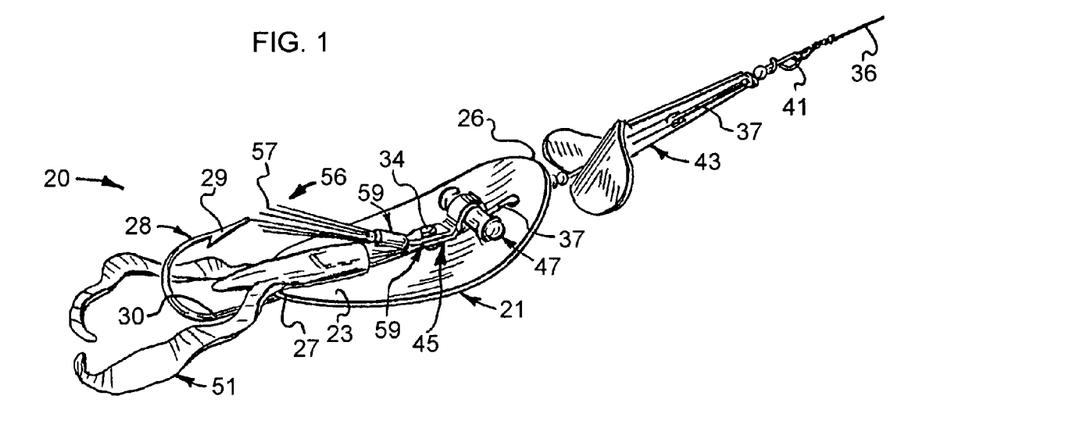
FIG. 1 is a perspective view of a preferred embodiment of the fishing lure system.
Figure 2:
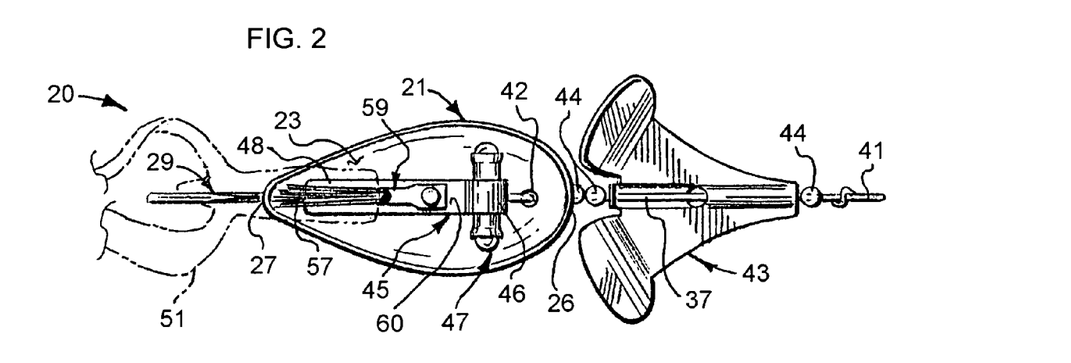
FIG. 2 is a top plan view of the preferred embodiment of the fishing lure system.
Figure 3:
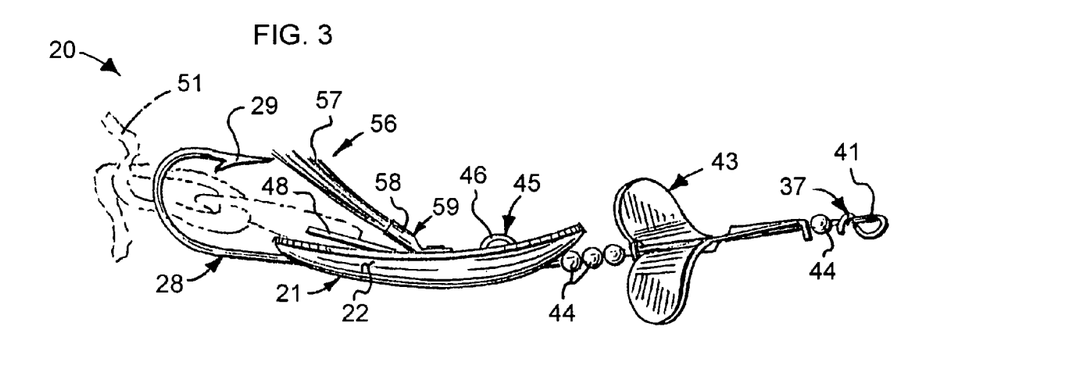
FIG. 3 is a left-side elevation view of the preferred embodiment of the fishing lure system.
Figure 4:
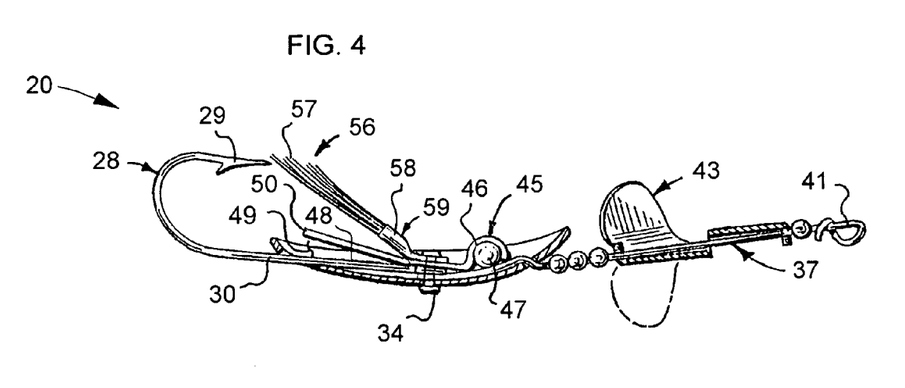
FIG. 4 is a cross-sectional view, in elevation, of the preferred embodiment of the fishing lure system.

The present invention also provides for a longitudinal bracket 45, preferably made of brass, which is mechanically attached, preferably by a rivet fastener 34, to the concave inner surface 23 of body portion 21. As shown in the plan view in FIG. 2, bracket 45 is structured and arranged to lie substantially along the longitudinal central axis of body portion 21. Bracket 45 comprises a partially rolled portion 46 which is structured and arranged to partially encircle a rattle 47 (embodying herein a rattle means, attached to such body portion, for emitting a vibration). When the bracket 45 (embodying herein a holding means, attached to such concave inner surface of such body portion, for holding such rattle means) is attached to the body portion 21, the rattle 47 is firmly held between the bracket 45 and concave inner surface 23. This arrangement effectively shields the rattle 47 thereby preventing accidental loss due to snagging or fish strikes. In addition, allowing the rattle 47 to remain in contact with the body portion 21 provides for an amplified vibration. The details of rattle 47 will be disclosed more fully hereinafter with respect to FIG. 7. The bracket 45 further comprises a substantially elongated portion 48 which is angled so as to provide a gap 49 (as shown best in FIG. 4) between bracket rear edge 50 (see FIG. 4) and the concave inner surface 23 thereby allowing for attachment of removable skirt 51 (as shown in FIGS. 1–3).

The skirt 51 serves a plurality of functions, namely, concealing hook 28, creating in the lure a vibratory life-like movement, and making the lure more appealing to fish. Attachment of the skirt 51 to bracket 45 consists of forming a longitudinal recess 52 (as shown best in FIG. 5) in the skirt end 53 (provided that the skirt is not already equipped with such a recess) and pushing the skirt end 53 onto the elongated portion 48. It is recommended that the longitudinal recess 52 be sized slightly smaller than the transverse dimension of the elongated portion 48 so as to provide a tight friction fit between the skirt end 53 and the elongated portion 48. To provide the aforementioned friction fit it is preferred that the skirt 51 be made of a rubber material. Though the skirt 51 illustrated in FIGS. 1–3 is of the duel worm-type, other shapes and configuration may also be used without deviating from the spirit of the present invention.

As shown in FIGS. 1–4, the present invention also provides for a brush guard 56 which is useful in preventing vegetation or other debris from snagging hook 28. The brush guard 56 is constructed by attaching, preferably by crimping, the ends (not shown) of a plurality of longitudinal filaments 57 (preferably made of a nylon material) to the hollow upper end 58 of filament holder 59 (as shown best in FIGS. 3–5). The filament holder 59 preferably comprises an electrical wire connector and is mechanically attached, preferably by use of a rivet connector 34, to the bracket top surface 60 (as shown best in FIG. 2). To effectively prevent vegetation and debris from snagging hook 28, the filaments 57 are sized so as to substantially span the distance from the filament holder 59 to the pointed hook first end 29 (as shown in FIGS. 1–4).

Figure 5:
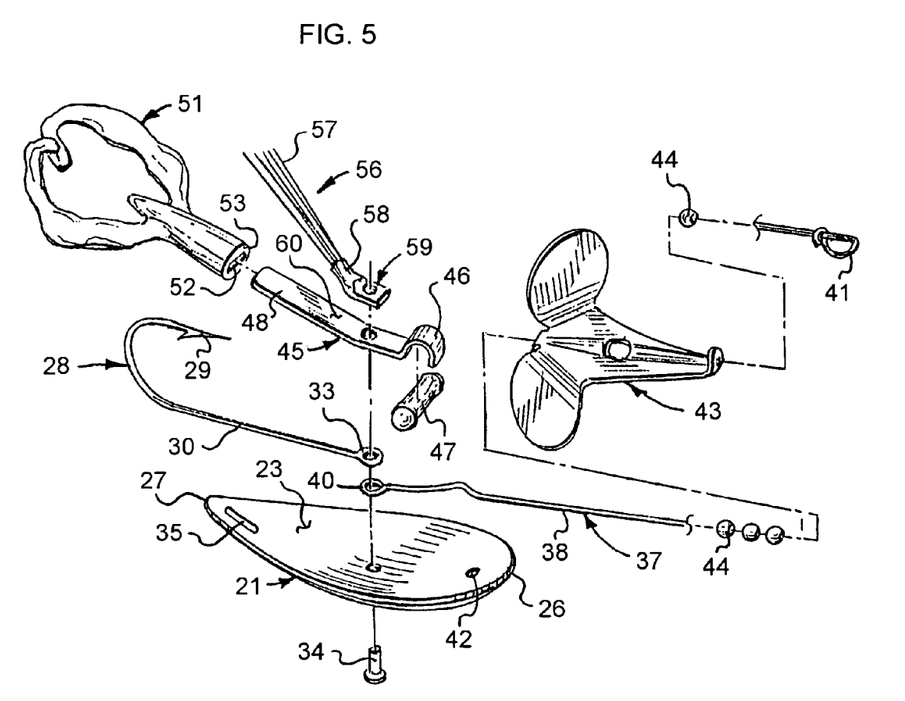
FIG. 5 is an exploded view of the preferred embodiment illustrating the various components comprising the fishing lure system.

Shown in FIG. 5 is an exploded view of the fishing lure 20 of the present invention illustrating the arrangement of the individual components hereinbefore illustrated and described with respect to FIGS. 1–4. Shown in FIG. 6, in perspective, is the preferred embodiment of the fishing lure 20 of the present invention illustrating the preferred location of the rivet fastener 34, rod hole 42 and slot 35.

Figures 6, 7, 8:
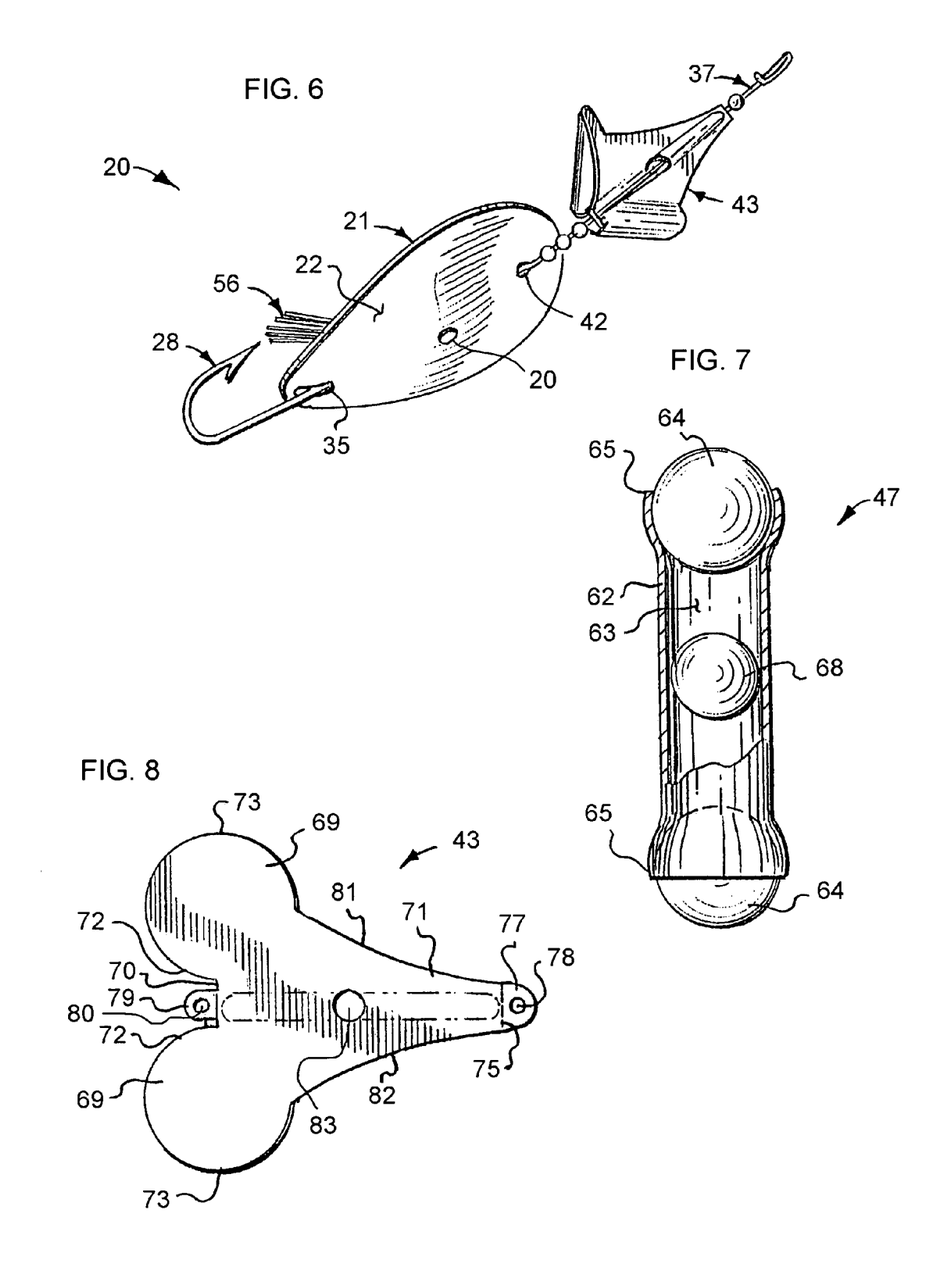
FIG. 6 is a perspective view of a preferred embodiment illustrating the placement of the various openings in the body portion.
FIG. 7 is an elevation view, partially in cross-section, illustrating the construction of the rattle.
FIG. 8 is a plan view of the spinner illustrating the preferred geometry of the spinner components.

Shown in FIG. 7, in partial cross-section, is the rattle 47 of the present invention. The rattle 47 comprises a rattle body 62 having a preferred longitudinal dimension of approximately 5/8 inch with a preferred outside diameter of approximately 3/16 inch. A chamber 63 is formed within the rattle body 62 by attaching, preferably by pressure fitting, a bearing 64, preferably a 3/16 inch outside diameter, grade 200 type 316 stainless (Abbott All Company, West Hartford, Conn.), to each rattle body end 65. Disposed within the chamber 65 is at least one moveable body 68, preferably a 5/32 inch outside diameter, grade 200 type 316 stainless bearing (Abbott All Company, West Hartford, Conn.). The moveable body 68 is sized to have a smaller diameter than the inner diameter of the rattle body 62 so as to provide for unobstructed movement therein. The rattle body 62, each bearing 64, and the moveable body 68 are preferably made of stainless steel which has been found to produce a sharper and more distinct vibration in the water. In operation, as the fishing lure 20 travels on or under the surface of the water, the combination of water turbulence, the spinner 43 and/or the skirt 51 will cause the fishing lure 20 to produce an animated wobble which has been found to be appealing to fish. This, in turn, causes the moveable body 68 to impinge the various above mentioned components comprising the rattle 47 which produces a vibration in the water that has been found to be attractive to fish.

The details comprising the preferred spinner 43 of the present invention are shown in FIG. 8. The spinner 43 comprises a pair of lobes 69 which are integrally attached adjacent the rear side 70 of spinner body 71. The lobes 69 and the spinner body 71 are preferably made of 0.015 inch thick brass having a nickel coating thereon and are formed by a typical metal stamping process. Each of lobes 69 has a substantially circular inner surface 72 and a substantially circular outer surface 73 which has been found to produce a greater lift at the leading edge 26 of the body portion 21. Each of lobes 69 is bent, preferably by a typical metal bending process, in opposite directions and at a substantially right angle to the plane of the spinner body 71 as shown in FIGS. 1–6. To provide a propeller-like action when the spinner 43 is in operation, the plane of each of the bent lobes 69 forms an angle with the longitudinal central axis of the spinner body 71 of approximately 45 degrees. A front tab 77 at a front edge 75 having a front hole 78 therein, and a rear tab 79 having a rear hole 80 therein are bent in opposite directions and at a substantially right angle to the plane of the spinner body 71 (as shown best in FIG. 5). A guide hole 83 is also provides in spinner body 71. Holes 78, 80 and 83 are sized so as to allow for rotatable attachment of the spinner 43 to rod member 37. Spinner sides 81 and 82, as shown, are not straight lines but have concave arcuate shapes as shown, and such sides, as shown, meet front edge 75 in a manner essentially asymptotic to said central axis.

The spinner 43 embodies in the present invention a propeller comprising: a body portion having a longitudinal central axis, a rear edge, and having a central hole therethrough; integrally attached to said body portion a front tab having a front tab hole therethrough and a rear tab having a rear tab therethrough, said front tab and said rear tab being bent in substantially parallel planes and at a substantially right angle to the plane of the body portion; a first lobe, integrally attached to said rear edge of said body portion and having a substantially circular inner surface and a substantially circular outer surface, said first lobe being bent at a substantially right angle to the plane of said body portion; and a second lobe, integrally attached to said rear edge of said body portion and having a substantially circular inner surface and a substantially circular outer surface, said second lobe being bent opposite of said first lobe and at a substantially right angle to the plane of said body portion; wherein said front tab hole, said rear tab hole, and said central hole are structured and arranged for pivotal mounting to an elongated wire; and wherein each of said pair of sides is cut away in a concave manner so that each said side meets said front edge in a manner essentially asymptotic to said central axis.

Figure 9:
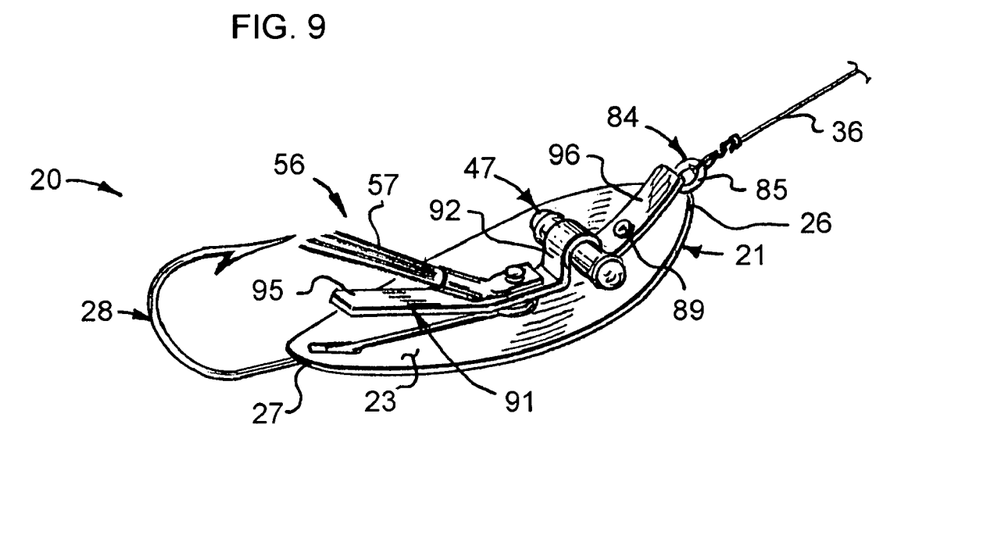
FIG. 9 is a perspective view of an alternate preferred embodiment of the fishing lure system of the present invention.
Figure 10:
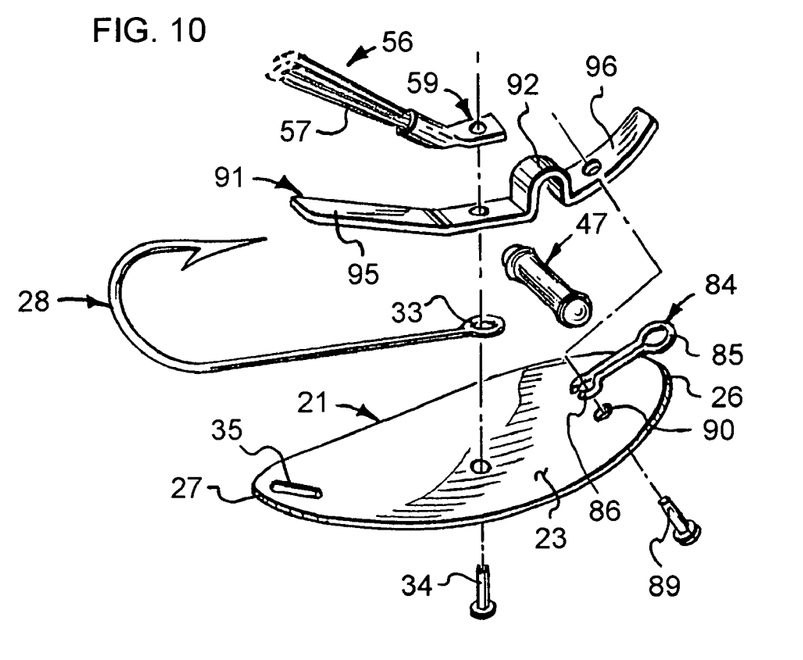
FIG. 10 is an exploded perspective view of the alternate preferred embodiment illustrating the components comprising the fishing lure system.

Shown in FIGS. 9–10 is an alternate preferred embodiment of the fishing lure 20 of the present invention. The fishing lure 20 comprises a spoon portion 21, rattle 47, brush guard 56, and hook 28 all substantially as hereinbefore illustrated and described with respect to the embodiment of FIGS. 1–5. The alternate preferred embodiment of the present invention also provides for a connector 84 (embodying herein an attachment means for attaching such fishing line to such body portion) having a looped connector first end 85 for attachment to a fishing line 36. The connector 84 further comprises a partially looped connector second end 86 (as shown best in FIG. 10) which is structured and arranged for mechanical attachment, preferably by use of rivet fastener 89, to the concave inner surface 23 of body portion 21. Rivet fastener 89 is structured and arranged to engage rivet hole 90 (as shown best in FIG. 10) which is preferably located along the longitudinal central axis of body portion 21 at approximately 12 percent of the distance from the rounded leading edge 26 to the rounded trailing edge 27. Also provided is a bracket 91 comprising a partially rolled central portion 92 which is structured and arranged to partially encircle a rattle 47 as shown in FIG. 9. As previously disclosed with respect to the preferred embodiment illustrated in FIGS. 1–6, when the bracket 91 is attached to the body portion 21, the rattle 47 is firmly held between the bracket 91 and concave inner surface 23. This arrangement effectively shields the rattle 47 thereby preventing accidental loss due to snagging or fish strikes. The bracket 91 further includes a substantially elongated portion 95 which is structured and arranged to allow for attachment of a removable skirt 51 (as shown in FIGS. 1–3) thereon. Also provided is a substantially elongated second portion 96 which is structured and arranged to overlap the connector second end 86 thereby preventing the connector 84 from bending or otherwise becoming separated from body portion 21. The bracket 91 is secured to the body portion 21 by use of mechanical fasteners, preferably rivet fasteners 34 and 89, as shown in FIGS. 9 and 10.

Figure 11:
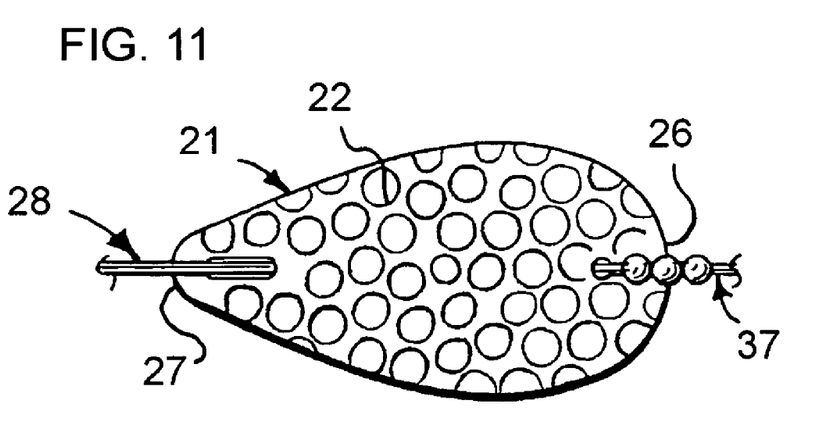
FIGS. 11–12 are plan views of the fishing lure system of the present invention illustrating various decorative details of the spoon portion.
Figure 12:
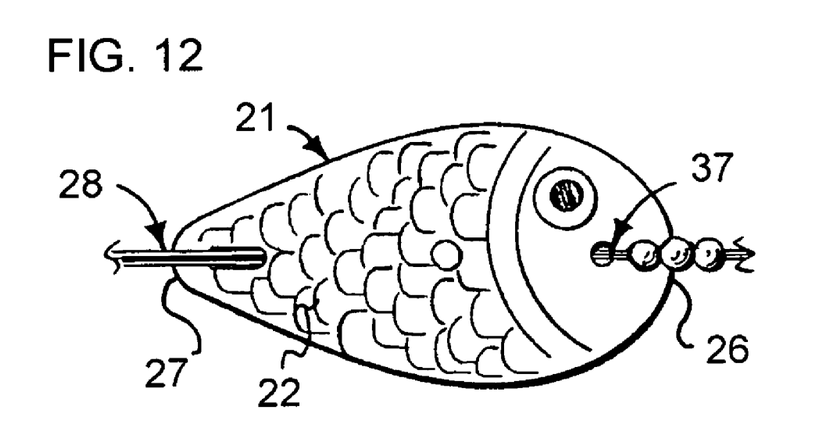

Shown in FIGS. 11 and 12 are alternate preferred decorative embodiments for the convex upper surface 22 of body portion 21. Shown in FIG. 11 is the convex upper surface 22 with a hammer finish which is produced by a typical hammer finishing process. Shown in FIG. 12 is the convex upper surface 22 on which is painted a representation of a fish. Though the preferred methods of decorating the convex top surface 22 are as illustrated and described herein, other decorative methods may be used without deviating from the spirit of the present invention.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A fishing lure, for use with a fishing rod having a fishing line, for catching fish, comprising in combination:
   a. an elongated body portion having a longitudinal central axis, a concave inner surface, a convex outer surface, a rounded leading edge, and a rounded trailing edge, said body portion further having a hole therethrough;
   b. a snaring means, attached to said body portion, for ensnaring a fish;
   c. a rattle means, attached to said body portion, for emitting a vibration;
   d. a holding means, attached to said concave inner surface of said body portion, for holding said rattle means;
   e. an attachment means for attaching said fishing line to said body portion;
   f. wherein said holding means comprises a bracket having an elongated portion, a top surface and a curved portion, said curved portion being structured and arranged to partially encircle said rattle means; and
   g. wherein said bracket further comprises an elongated second portion structured and arranged to substantially span a distance between said curved portion and said rounded leading edge of said spoon portion.

2. The fishing lure according to claim 1 wherein said attachment means is attached to said leading edge of said body portion between said concave inner surface and said elongated second portion of said bracket.

3. A fishing lure, for use with a fishing rod having a fishing line, for catching fish, comprising in combination:
   a. an elongated body portion having a concave inner surface, a convex outer surface a rounded leading edge, and a rounded trailing edge, said body portion further having a hole therethrough;

b. at least one hook having a hook first end and a hook second end, said hook second end being structured and arranged for attachment to said body portion;

c. a rattle, attached to said body portion, having a cylindrical body portion having a chamber therein for holding at least one moveable body;

d. a bracket attached to said body portion and having an elongated portion and a curved portion, said curved portion being structured and arranged to partially encircle said rattle;

e. an attachment means for attaching said fishing line to said body portion;

f. a weed guard attached to said concave inner surface of said body portion; and g. a skirt having a skirt first end, said skirt first end being removably attached to said elongated portion of said bracket;

h. wherein said leading edge has a larger radius than said trailing edge;

i. wherein said hole in said body portion is structured and arranged for location adjacent said longitudinal central axis of said body portion at approximately twelve percent of the distance from said rounded leading edge to said rounded trailing edge; and j. wherein said bracket further comprises an elongated second portion structured and arranged to substantially span a distance between said curved portion and said rounded leading edge of said spoon portion.

4. The fishing lure according to claim 3 wherein said attachment means is attached to said leading edge of said body portion between said concave inner surface and said elongated second portion of said bracket.

* * * * *